Patented Sept. 15, 1936

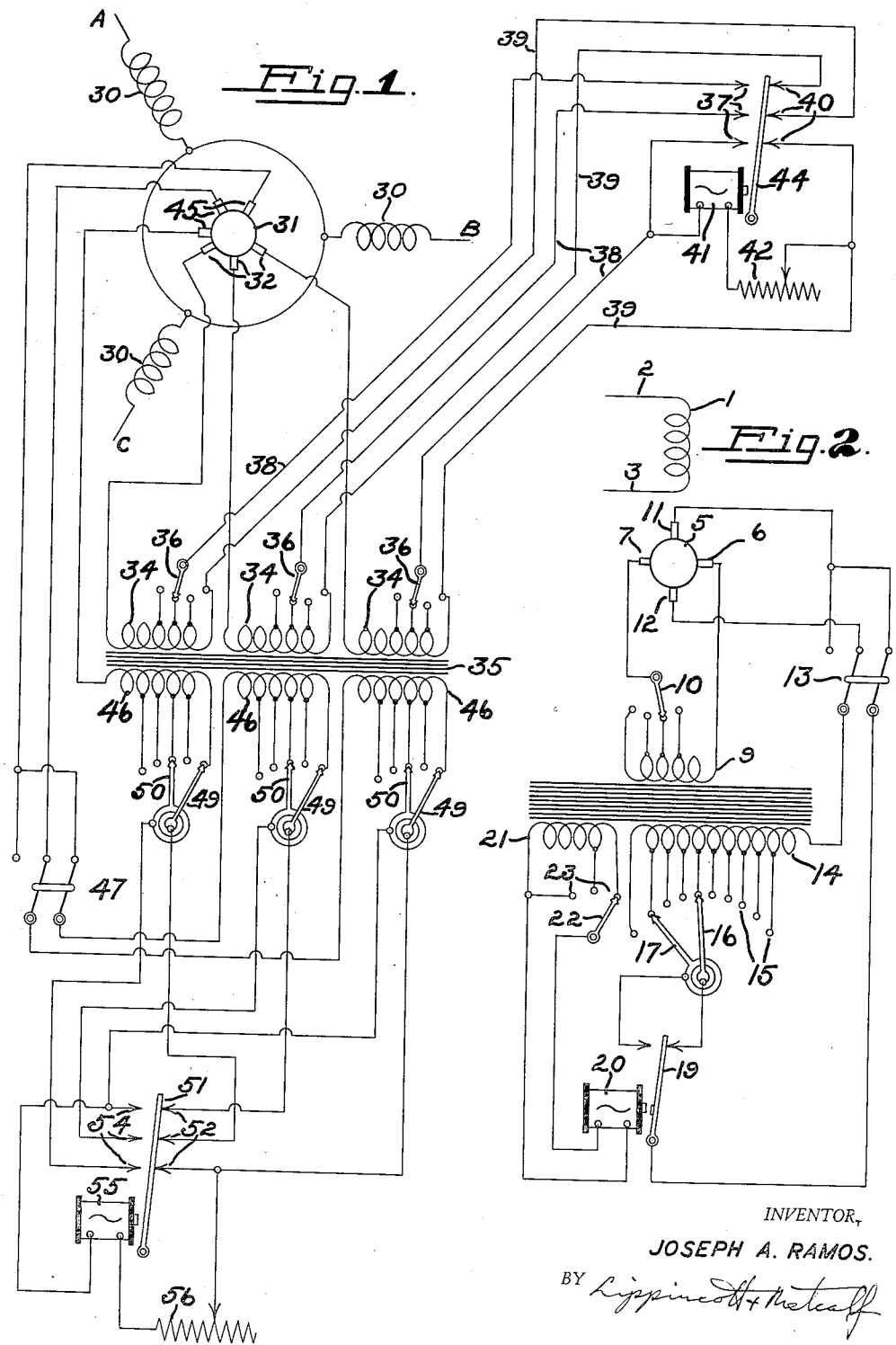

2,054,446

UNITED STATES PATENT OFFICE 2,054,446

VARIABLE SPEED MOTOR

Joseph A. Ramos, San Francisco, Calif., assignor of one-half to Benjamin Delmas, San Francisco, Calif.

Application December 24, 1935, Serial No. 56,068

10 Claims. (Cl. 172—276)

This application relates to variable speed, commutator type A. C. motors, and particularly to a means and method for causing motors of this class to operate at substantially constant predetermined speeds under widely differing load conditions.

Among the objects of this invention are: To provide an alternating current motor having a wide range of operating speeds; to provide a motor which will operate at any predetermined speed within its range at substantially all conditions of load between zero and a predetermined value of overload; to provide a motor which will operate under the above-stated condition in either direction, being readily and simply reversible; to provide a control system for a motor of the class described which is light, simple, and efficient; to provide a motor of the class described whose efficiency does not change materially with the speed at which it is operated; and to provide a control system for such a motor wherein the currents which must be handled are relatively small, so that the current-carrying contacts may be at the same time light and not subject to speedy deterioration.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

The system of my invention may be used on either single or polyphase commutator type motors. Considered broadly the method consists in introducing into the armature in a plane substantially parallel to the main field, an E. M. F. in phase with the line voltage, and varying this E. M. F. in accordance with the load on the motor to keep the speed constant. In its preferred embodiment the system involves deriving the main armature current by induction from the field through a brush set disposed transversely to said field as in the simple repulsion motor. Instead of these brushes being short-circuited, however, they are connected to the primary of a transformer, this primary being preferably of low impedance. From the secondary of this transformer a compensating current is supplied to the armature through a second set of brushes which is electrically perpendicular to the main brushes, i. e., is disposed at 90 electrical degrees to the main brushes. The speed at which the motor operates under any given load will be a function of the ratio of transformation of this transformer, which is therefore tapped so that any desired ratio may be obtained. In operating the motor, one of these taps is selected which will give a desired predetermined speed at one definite load condition, e. g., no load, and another tap is selected which will give the speed desired under some other load condition such as full load. Means are provided for switching the brushes of one of the sets between the two taps of its respective winding, the switching means being responsive to the voltage impressed across the transformer, this switching means being so arranged that when full load is impressed upon the motor, the appropriate tap will be connected, while when no load is imposed the other tap will be connected. As a result of this arrangement, when the motor is operating upon an intermediate load it will vary slightly in speed, but this variation will be gradual and the connection will oscillate between the full-load connection and the no-load connection at such a rate that the average speed of the motor remains constant at the desired value. Experience has shown that none of these adjustments are critical and that the motor may be maintained at substantially its desired speed at almost any load, the cyclic fluctuations in speed being negligibly small.

It will be recognized by those skilled in the art that the system will still be operative if the compensating or speed-regulating E. M. F. be derived from a source other than the armature, if the load current be utilized as described to regulate this E. M. F. The preferred embodiment, however, gives a wider range of economical speed regulation.

Referring to the drawing:

Figure 1 is a schematic circuit diagram of my invention as embodied in a three-phase motor, the brush arrangement being that appropriate to a motor of the four-pole type.

Figure 2 is a similar diagram of my invention as embodied in a two-pole single phase motor.

For the purposes of detailed exposition of my invention, I prefer to describe the simple single phase embodiment shown in Figure 2. In this figure the coil I represents a field or stator winding, which may be of any of the conventional types, and which is supplied from the leads 2 and 3.

The armature 5 may be supplied with any of the known types of winding, and is provided with a commutator upon which bear the brushes 6—7, which are mounted transverse to the stator field. Preferably, these brushes are given no angle of lead, although such an angle will not render the device inoperative. These brushes correspond, of course, to the ordinary repulsion motor brushes, and for purposes of identification will be hereinafter referred to as "repulsion brushes". Instead of being short-circuited, however, these brushes are connected to a tapped transformer winding 9, with a selective switch 10 included in the circuit by which the impedance of this winding, as viewed from the commutator, may be varied. The actual value of the impedance will, of course, depend upon the armature winding itself, but the order of the quantities involved may be appreciated from a consideration of the values used in one experimental motor, wherein the open circuit voltage across the brushes with locked rotor is 100 volts and the primary coil 9 is wound for a maximum voltage of 10 and a minimum voltage of 2. As will be seen later, the tapping of the transformer primary is designed to give greater flexibility, but is not an essential feature, since many of the advantages of the invention may be realized without a primary adjustment.

A second set of brushes 11—12, spaced from the first set by 90 electric degrees, and hereinafter referred to as the "compensating brushes" is connected to a reversing switch 13 and thence to a tapped secondary winding 14 which is coupled to the primary 9. The secondary taps 15 are preferably arranged to give a large choice of secondary impedance, and two selector switches 16 and 17, properly insulated from each other, are arranged to make contact with the various taps. The selector switch 16 is connected to one contact of a relay, while the selector 17 connects with the other relay contact. The relay arm 19 completes the circuit back to the reversing switch 13. The minimum impedance of the winding 14 is preferably greater than the primary impedance of the transformer.

The actuating coil 20 of the change-over relay is excited from the transformer. In the present instance this coil is shown as supplied from a separate winding 21, the voltage on the winding being adjustable by means of the switch 22 which contacts with taps 23 on the winding. For purposes of adjustment it is desirable that one of these taps be so arranged as to render the relay inoperative.

In operation, the voltage set up by the stator flux in the armature winding causes a current to flow in the transformer primary which current is substantially in phase with the line voltage, the leakage reactance to the transformer being small and its input impedance low. This impresses an E. M. F. across the compensating brushes. The primary current, and hence the secondary voltage, are a function of the load, and the effect of the E. M. F. in the compensating circuit is to increase the speed of the motor.

In starting operation the switch 22 is set to render the relay coil inactive and the selector switch 16 is set to give the desired speed at no load. The switch 22 is next set so as to actuate the relay to throw the selector switch 17 in the circuit, and this switch is then adjusted to give the same or any other desired speed at full load. As a final adjustment, the switch 22 is adjusted so that the relay will operate at a voltage intermediate that corresponding to no load and full load, with the result that at intermediate loads it will first pull into the full-load condition. This will cause the motor to speed up, decreasing the armature current and the voltage on the relay until the latter trips, switching to the no-load connection. The motor will then slow down and the primary current and voltage will drop until the relay again pulls back to the full-load position and the cycle repeats.

The current which must be handled by the relay contact is not great, being of the order of three or four amperes for a two horse power test machine. The E. M. F. applied in this instance across the compensating brushes did not exceed 60 volts, and it was found that an extremely simple and rugged relay could be used. The selector switch 10 is preferably set to give the lowest primary impedance which is compatible with a desired speed. In this instance it may also be used, with very slight disadvantage, in selecting the desired point at which the relay operates.

The direction of the resultant magnetic field through the armature, and hence the direction of rotation of the motor, is dependent upon the phase relationship between the primary and the secondary of the transformer, and hence the reversing switch 13 offers a simple means of reversing the direction of rotation of the motor. The efficiency of the motor is substantially the same at any operating speed.

This same method of speed control may be utilized in polyphase motors, as is shown schematically in Figure 1. In this embodiment of the invention a number of slight modifications are shown, which are equally applicable to single-phase operation.

The line supply from phases A, B, and C is connected to the conventional three-phase stator windings 30, which are shown as being star-connected. In order to simplify the drawing, the brushes are shown as arranged for a four-pole motor with equalizing connection on the armature 31, the repulsion brushes 32 being each connected to one terminal of a star-connected primary 34 on a three-phase transformer 35. As in the single phase example, the primary winding is of low impedance and is tapped, and a lead 38 connects from each of the selector switches 36 which contact these taps to one set of relay contacts 37. Other leads 39 connect from the other terminal of each of the primary windings to the second set of relay contacts 40.

The relay coil 41 is connected between the leads 38 and 39 of one phase of the primary circuit through a variable resistor 42, and the relay arm 44 connects either the contacts 37 or the contacts 40 together to form the common point of the star-connected primary circuit.

The second set of brushes, or compensating brushes 45, positioned electrically perpendicular to the repulsion brushes, are connected in similar manner to the secondary winding 46, a reversing switch 47 being included between any two of the phases. As in the single phase embodiment, the secondaries are tapped and are provided with high-load and low-load selector switches 49 and 50, respectively.

As in the primary circuit the change-over relay is excited from the voltage drop across one phase of the main circuit, the relay arm 51 connecting with either the contacts 52 or the contacts 54 to connect either the selector switches 49 or selector switches 50 at the common point of the star-connected secondary. The relay winding 55 connects through the rheostat 56 across one phase of the secondary.

The preferable mode of operation is substantially similar to that of the single phase embodiment previously described. The selector switches 49 and 50 are preferably each connected to operate from a single control, and may be set for no-load and full-load conditions as before. In addition, however, the primary relay is preferably arranged to change over between the conditions of full load and some predetermined degree of overload, so that where, with high-load current, the voltage drop per primary turn becomes large, the relay will switch over to reduce the number of primary turns in circuit and thus increase the step-up ratio of the transformer, thus securing an even wider load range at which the device will operate at constant speed.

It is obvious that the relay connections in the primary and secondary circuits of Figure 1 and in the secondary circuit of Figure 2 differ slightly as between themselves, but it is not to be inferred that any of these various connections is necessarily better adapted to the particular application in which it is shown. The necessary and sufficient feature in each case is that the relay be responsive to the load, and it is obvious that in each case the voltage drop across the relay coil will be dependent upon the primary current, since this will determine the volts per turn in the winding which excites the relay. Of the various showings the arrangements shown in Figure 2 are probably to be preferred, since the rheostat adjustment of the relay oscillating point may be made practically continuous and the rheostat can often be provided at a lower price than the tap switch.

It should also be pointed out that deriving the speed-controlling E. M. F. from the armature winding, instead of from a transformer connected directly to the supply line, of itself tends to hold the speed constant with changing load, and it is for this reason that this method of supplying the compensating potential is preferred. If the transformer through which the compensating potential is supplied be considered as a current transformer, causing a negligible potential drop in the primary, it is clear that the compensating potential will vary directly as the load current, tending to increase the speed with load, and that with suitable design this effect could itself be used to hold the speed constant or even increase it with load. In practice, however, the primary impedance of the transformer is not zero, and so tends to increase the voltage drop and decrease the main current as the load increases, dropping the speed. Which of these two effects is dominant depends on the design characteristics of the entire system, but in general the dominance of the former may be expected. Use of the compensating E. M. F. from the armature will therefore give less over-all variation of speed than will the method of deriving this E. M. F. from the line, and will impose less duty on the relay contacts than will the latter method, in spite of the fact that if the latter be used the impedance that need be introduced between the repulsion brushes is merely that required to get sufficient energy to operate the relay, and may be neglected. Both methods, however, fall within the scope of the claims.

I claim:

1. In an A. C. motor having a commutator, a set of repulsion brushes contacting said commutator, a set of compensating brushes contacting said commutator electrically intermediate said repulsion brushes, a variable-ratio step-up transformer, connections between said repulsion brushes and the low-voltage winding of said transformer and between said compensating brushes and the high-voltage winding of said transformer, and means dependent upon the voltage across said transformer for varying the step-up ratio thereof.

2. In an A. C. motor having a commutator, a set of repulsion brushes contacting said commutator, a set of compensating brushes contacting said commutator electrically intermediate said repulsion brushes, a transformer having a low impedance winding and a high impedance winding, at least one of said windings being tapped to give a variable ratio of transformation, connections from said repulsion brushes to said low impedance winding and from said compensating brushes to said high impedance winding, a relay connected to operate in response to the voltage drop across said windings, and connections from said relay to a plurality of the taps on said tapped winding to change the ratio of transformation in accordance with the voltage drop therein.

3. In combination with an A. C. motor having an armature and two sets of brushes mounted in electrically perpendicular relationship, means for maintaining a substantially constant speed of said motor under varying load comprising a transformer having a primary winding connected to one of said sets of brushes and a tapped secondary winding connected to one brush of the other set, a pair of contacts for pre-selecting two of the taps on said secondary, one whereof corresponds to the desired full-load speed and the other to the desired speed at another condition of load, and a relay connected to operate from a winding of said transformer and operative to connect one or the other of said pre-selected taps to the second brush of said last identified set in accordance with the voltage impressed on said transformer.

4. In an A. C. motor having a commutator, a set of repulsion brushes contacting said commutator, a set of compensating brushes contacting said commutator electrically intermediate said repulsion brushes, a transformer having a primary winding connected to said repulsion brushes and a secondary winding connected to said compensating brushes, and means dependent on the voltage impressed across said transformer for varying the ratio of transformation thereof.

5. In an A. C. motor having a commutator, a set of repulsion brushes contacting said commutator, a set of compensating brushes contacting said commutator electrically intermediate said repulsion brushes, a transformer having a primary winding connected to said repulsion brushes and a secondary winding connected to said compensating brushes, taps on one of the windings of said transformer, a relay connected to operate from a winding on said transformer, and contacts on said relay connected to select between predetermined taps for connection of said tapped winding to its respective brushes in accordance with the voltage impressed across said relay.

6. In an A. C. motor having a commutator, a set of repulsion brushes contacting said commutator, a set of compensating brushes contacting said commutator electrically intermediate said repulsion brushes, a transformer having a primary winding connected to said repulsion brushes and a secondary winding connected to said compensating brushes, taps on each of said windings, relay contacts interposed between each of the windings of said transformer and their respective brushes and connected to certain of the taps on said windings, and energizing means operative in accordance with the voltage across said transformer to connect said brushes to predetermined taps, the energizing means associated with one set of brushes and taps being operative between certain predetermined load limits and that associated with the other set of brushes and taps being operative between different predetermined load limits.

7. In a commutator A. C. motor having a pair of repulsion brushes mounted substantially electrically perpendicular to the main field and a pair of compensating brushes mounted substantially parallel to said field, means for applying an E. M. F. to said compensating brushes and means responsive to the current in said repulsion brushes for varying said E. M. F. to hold the speed of said motor substantially constant with varying load.

8. In a motor having a commutator and adapted to be energized from an A. C. source, means for drawing a current dependent on the load on said motor from said commutator, means for applying across said commutator in a plane electrically perpendicular to said current an E. M. F. substantially in phase with that of said source, and means responsive to the magnitude of said current for varying said E. M. F. in response to said load current.

9. In a motor having a commutator and adapted to be energized from an A. C. source, means for drawing a current dependent on the load on said motor from said commutator, means for applying across said commutator in a plane electrically perpendicular to said current an E. M. F. substantially in phase with that of said source, and means for increasing said E. M. F. in response to increases of load current to a greater degree than said current is increased.

10. In a motor having a commutator and adapted to be energized from an A. C. source, means for drawing a current dependent on the load on said motor from said commutator, means for applying across said commutator in a plane electrically perpendicular to said current an E. M. F. substantially in phase with that of said source, and means including a relay actuated in response to said load current for increasing said E. M. F. in response to increases of load current to a greater degree than said current is increased.

JOSEPH A. RAMOS.